(12) United States Patent
Irie et al.

(10) Patent No.: US 7,694,900 B2
(45) Date of Patent: Apr. 13, 2010

(54) METHOD FOR DISINTEGRATING HYDRATE POLYMER AND METHOD FOR PRODUCTION OF WATER-ABSORBENT RESIN

(75) Inventors: Yoshio Irie, Himeji (JP); Yorimichi Dairoku, Himeji (JP); Yasuhiro Fujita, Himeji (JP); Kenji Tada, Himeji (JP); Hirofumi Shibata, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/829,706

(22) Filed: Apr. 22, 2004

(65) Prior Publication Data
US 2004/0234607 A1 Nov. 25, 2004

(30) Foreign Application Priority Data
Apr. 25, 2003 (JP) ............................. 2003-122002

(51) Int. Cl.
*B02C 1/00* (2006.01)
*B02C 23/18* (2006.01)

(52) U.S. Cl. .......................................... 241/15; 241/23

(58) Field of Classification Search ................... 241/15; 521/53; 523/319
See application file for complete search history.

(56) References Cited

U.S. PATENT DOCUMENTS

| | | | |
|---|---|---|---|
| 4,100,244 A | 7/1978 | Nonaka | 264/211 |
| 5,064,582 A * | 11/1991 | Sutton et al. | 264/37.29 |
| 5,275,773 A | 1/1994 | Irie et al. | 264/141 |
| 5,630,968 A | 5/1997 | Wang et al. | 264/53 |
| 6,100,305 A * | 8/2000 | Miyake et al. | 521/53 |
| 6,107,358 A * | 8/2000 | Harada et al. | 521/133 |
| 6,140,395 A * | 10/2000 | Hatsuda et al. | 523/319 |

FOREIGN PATENT DOCUMENTS

| | | |
|---|---|---|
| EP | 0 096 790 B1 | 12/1983 |
| EP | 0 789 047 A1 | 8/1997 |
| EP | 1 178 059 A2 | 2/2002 |
| JP | 3-73576 | 11/1991 |
| JP | 06-041319 | 2/1994 |
| JP | 10-087842 | 4/1998 |
| JP | 11-35691 | 2/1999 |
| JP | 11-188727 | 7/1999 |
| JP | 2000-063527 | 2/2000 |
| JP | 3145461 | 1/2001 |
| JP | 2002-212204 | 7/2002 |
| JP | A-2002-240033 | 8/2002 |

OTHER PUBLICATIONS

Notice of Reason for Refusal dated Apr. 28, 2009 from corresponding application 2004-128299.

* cited by examiner

Primary Examiner—Bena Miller
(74) Attorney, Agent, or Firm—Occhiuti Rohlicek & Tsao LLP (57) ABSTRACT

A method for disintegrating a hydrate polymer characterized by disintegrating a hydrate polymer having a solid content in the range of 50-70 wt. % with a screw extruder while supplying 0.1-30 parts by weight of water per 100 parts by weight of the polymer to the extruder. Since the product of disintegration is prevented from inducing mutual adhesion, it does not form masses of conglomeration when it is dried.

6 Claims, 3 Drawing Sheets

FIG. 4

METHOD FOR DISINTEGRATING HYDRATE POLYMER AND METHOD FOR PRODUCTION OF WATER-ABSORBENT RESIN

BACKGROUND OF THE INVENTION

1. Field of the Invention

This invention relates to a method for disintegrating a hydrate polymer and a method for producing a water-absorbent resin while using a disintegrating step as part of the procedure thereof. More particularly, this invention relates to a method for disintegrating a hydrate polymer which, while disintegrating a hydrate polymer by using a screw extruder, executes the disintegration with water fed to the device, prevents the device from generating a kneading motion during the course of disintegration, and allows the product of the disintegrating to be arranged in a uniform thickness in a dryer, and a method for producing a water-absorbent resin while using a disintegrating step as part of the procedure thereof.

2. Description of the Related Art

The water-absorbent resin possesses the property of absorbing a large volume of water and has been used as materials for forming such sanitary articles as disposable diapers, sanitary napkins, and incontinence pants, a water retaining agent for soil, and drip absorbing sheets for foodstuffs. For use particularly in such sanitary articles as disposable diapers, the development of a water-absorbent resin having a high ratio of absorption capacity under high pressure has been yearned for allowing a decrease in the thickness of the product.

The water-absorbent resin of this kind is produced by polymerizing a monomer solution including acrylic acid or sodium acrylate etc. in the presence of a cross-linking agent and thereafter disintegrating the resultant polymer into a proper size.

Since the hydrate polymer contains water, the hydrate polymer is dried and pulverized in a target size after the drying process generally. Furthermore prior to the drying process, it is necessary for the hydrate polymer to be disintegrated so as to secure large surface of the polymer for the purpose of heightening the efficiency of drying. As means to disintegrate a hydrate gel-like polymer having a water content in the range of 50-80 wt. %, methods directed toward continuing a disintegration while supplying proper additives to the site of disintegrating such as, for example, a method which comprises supplying a detackifying agent having a boiling point in the range of 200-400° C. together with a gel to an extruding device (JP-B-1991-73576), a method which comprises supplying such an anti-adhesion agent as silicone oil to the contact surface of a cutting blade (JP-A-1998-87842), and a method which comprises supplying such a hydrophilic organic solvent as alcohol as a lubricant to the neighborhood of a rotary blade (JP-A-1999-35691) have been available. A method which comprises extruding a hydrate polymer in a thickness in the range of 1-20 mm through a perforated plate having a pore diameter in the range of 3-20 mm in due consideration of such factors as the friction between the wall surface of an extruding device and the hydrate gel-like polymer and disintegrating the resultant gel having a small water-soluble component and containing a small amount of a residual monomer (JP-A-1994-41319) and a method which comprises heating a hydrate polymer to a temperature in the range of 45-90° C. and extruding the hot hydrate polymer through a perforated plate having a pore diameter in the range of 6.5-18 mm (JP Patent No. 3145461) have been available. Further, as means to confer improvements on the devices, a method which comprises disintegrating a hydrate polymer while keeping this polymer nipped between opposed helical rotary blades having different feed rates (JP-A-1999-188727) and a method which comprises disintegrating a hydrate polymer by the use of a device provided near the extruding port thereof with a reverse-proofing member for the purpose of preventing the gel from flowing back (JP-A-2000-63527) have been available. They concern techniques for preventing the disintegrated hydrate polymer from adhering to the device or forming a conglomerate due to self-adhesion of the fact that a hydrate polymer having a water content in the range of 50-80 wt. % manifests stickiness and also concern techniques for preventing the hydrate gel-like polymer disintegrated with a meat chopper or a kneader from giving rise to a kneading motion. When the hydrate polymer during the course of disintegration is compressed by kneading, the resultant hydrate gel-like polymer is affected by such a powerful external mechanical force as to suffer breakage of the cross-linked polymer chain or increase the amount of a water-soluble component. The product of this disintegration possibly yields to self-adhesion and, during the course of drying, undergoes conglomeration and entails a decrease in the drying efficiency.

Meanwhile, the hydrate polymer having a water content in the range of 30-50wt. %, namely containing a solid component at a concentration in the range of 50-70 wt. %, is so difficult to handle because of its property that any attempt to disintegrate it to an extent of being directly dried in its unmodified form on a commercial scale has been made only in vain. Example 1 of JP-B-1991-73576 was barely capable of disintegrating a gel having a solid content of 33 wt. %, Example 1 of JP-A-1998-87842 a solid content of 25 wt. %, Example 1 of JP-A-1999-35691 a solid content of 30 wt. %, Example 1 of JP-A-1994-41319 a solid content 38 wt. %, Example 1 of JP Patent No. 3145461 a solid content of 38 wt. %, JP-A-1999-188727 succeeded in disintegrating a polymer having a water content of 39 wt. % but required use of an expensive device, and JP-A-2000-63527 used a gel having a solid component of 35 wt. %. Incidentally, when the solid content exceeds 82 wt. %, the hydrate polymer can be disintegrated by an ordinary shock type pulverizer similarly to a dried polymer.

When the monomer component which is a raw material compound for a water-absorbent resin is subjected to aqueous solution polymerization and the resultant polymer is deprived of the water contained therein, this removal of water necessitates time and thermal energy and rise the unit cost of production. Thus, attempts to develop a technique of producing a hydrate polymer of a high solid content and reducing this hydrate polymer to a finished commercial product have been continued. For example, a method for disintegrating a hydrate polymer having a high solid content in the range of 55-82 wt. % (water content 18-45 wt. %) as compared with the conventional hydrate polymer has been developed and a method for effecting expected disintegrating by the use of a vertical pulverizing device provided with a screen (JP-A-2002-212204). The method consist in increasing by not less than 2 points the solid content of the hydrate polymer having a solid content in the range of 55-82 wt. % by the use of the device mentioned above and/or disintegrating the hydrate polymer by passing a gas, preferably dry air, through the interior of the disintegrating device. The steam generated in the device tends to condense in the device and induce the hydrate polymer to adhere to and block the interior of the device but the ventilation serves to repress these adverse effects of the steam. None of the patent publications mentioned above report a case of disintegrating a hydrate polymer having a solid content in the range of 50-70 wt. % by the use of a screw extruder.

Among the group of disintegrating machines, a screw extruder is an inexpensive and compact machine. It may be readily adopted when it is capable of disintegrating a hydrate polymer having a solid content in the range of 50-70 wt. %. When this device is simply used for disintegrating the hydrate polymer, the product of disintegrating possibly undergo adhesion on the screw in motion. Once the adhesion between the product of disintegrating occurs, it will not be easily dispersed in a uniform thickness and will form a cause for degrading the efficiency of drying at the subsequent drying step. Further, when the particles resulting from the drying are mutually bound to form masses, these masses necessitate a pulverizing step and they possibly undergo pulverization to give rise to a fine powder. The occurrence of this fine powder results in degrading the quality of the product and increasing the loss of product.

When the hydrate polymer is disintegrated while it is kneaded and compressed during the course of disintegration, the hydrate polymer is exposed to a powerful mechanical force, with the result that it will cause breakage of the cross-linked polymer chain and increase the amount of the water-soluble component. Particularly when the hydrate polymer has been obtained by polymerizing a water-soluble ethylenically unsaturated monomer in the presence of a cross-linking agent so as to contain bubbles therein, the resultant water-absorbent resin possibly suffers the property thereof degraded because the bubbles contained therein are crushed by the kneading motion.

The water-absorbent resin is required to retain a prescribed absorption capacity and keep the contents of the residual monomer and water-soluble component below prescribed levels, depending on the kind of use and from the standpoint of the feeling of use. It is well known that the property of the water-absorbent resin is varied by the method for disintegrating. The development of a disintegration method which is capable of producing a hydrate polymer of high quality is yearned for.

This invention, therefore, is aimed at providing a method for disintegrating a hydrate polymer having a solid content in the range of 50-70 wt. %, which method, while executing the disintegrating by the use of a screw extruder, induces generation of a kneading motion and entails mutual adhesion of the product of disintegration only meagerly and enables this product to be dispersed in a uniform thickness in a dryer.

SUMMARY OF THE INVENTION

The present inventors have pursued an elaborate study on the disintegrating of a hydrate polymer having a solid content in the range of 50-70 wt. % by the use of a screw extruder and have consequently found that when the disintegration is effected in conjunction with the addition of water, the hydrate polymer can be efficiently prevented from generating a kneading motion and, at the same time, the product of shedding can be efficiently prevented from mutual adhesion and, consequently, the product gel of disintegration in the subsequent step of drying can be dispersed in a uniform and fixed thickness in a dryer. The present invention has been perfected as a result.

According to this invention, owing to the prevention of the product of disintegration from mutual adhesion, this product can be uniformly dispersed and can be restrained from forming masses of conglomeration during drying and, as a result, the occurrence of a fine powder due to the pulverization of the masses can be repressed. Further, since the generation of a kneading motion can be prevented, the formation of a water-soluble component is slight and the physical and chemical damage inflicted on the resultant water-absorbent resin is also slight and the water-absorbent resin enjoys a high quality. This method is capable of exalting the yield and allaying the loss by discarding as well and proves to be highly useful.

When the hydrate polymer having a water content in the range of 50-70 wt. % is disintegrated with a screw extruder, the product of disintegration can be prevented from generating a kneading motion and yielding to mutual adhesion by simply adding 0.1-30 parts by weight of water to 100 parts by weight of the polymer according to this invention.

Owing to the avoidance of the mutual adhesion, the product of disintegration can be uniformly dispersed. When it is dried, the occurrence of masses which would possibly result from mutual adhesion of the product of disintegration can be prevented.

Since the product of disintegration can be prevented from generating a kneading motion, the formation of the soluble component heretofore induced by the breakage of the hydrate polymer under such a physical load as the kneading motion can be allayed. Particularly, the use of steam brings such an unexpected effect of markedly decreasing the residual monomer.

DESCRIPTION OF THE PREFERRED EMBODIMENT

The first aspect of this invention is directed toward a method for disintegrating a hydrate polymer having a solid content in the range of 50-70 wt. % with a screw extruder, in which said polymer is disintegrated while supplying 0.1-30 parts by weight of water per 100 parts by weight of said hydrate polymer.

The technique of obtaining a hydrate polymer having a high solid content and reducing it to a commercial product has been tried with the object of simplifying the step of drying. In view of the use of the water-absorbent resin, this water-absorbent resin is required to have the residual monomer and the water-soluble component in small amounts and exhibit the absorption capacity within a prescribed range. This invention, in consequence of the development of the hydrate polymer having a solid content in the range of 50-70 wt. %, aims to propose a method for disintegrating of the hydrate polymer with a simple device and subsequently obtaining a water-absorbent resin of high quality. The term "disintegration" or "disintegrating" as used in this invention refers to an operation in order to make the dry of the polymer easy by exerting shear force to bear down on the hydrate polymer thereby decreasing the size of the hydrate polymer to a particulate order and enlarging the surface area thereof.

The disintegrating device to be used in this invention is a screw extruder which fulfills a function of rotating a screw within a stationary barrel thereby conveying material in the axial direction. This invention only requires the screw extruder to comprise a casing provided with a supply port for a hydrate polymer as the target for disintegration and an extrusion port for the product of disintegration, a perforated plate and a rotary blade for disintegration the hydrate polymer to an optimum size, and a screw for conveying the hydrate polymer to the perforated plate in the case. The number of screws may be one, two, or four, whichever suits the occasion best. In the case of an extruder having two axes, the two axes may be in one same direction or in two different directions. As concrete examples of the screw extruder, the so-called meat chopper (made by Hiraga Seisakusho K.K.) and the screw extruders introduced in §5.3.12 of Handbook of Chemical Engineering, 6 th edition (compiled by Japanese Society of Chemical Engineering and published by Maruzen) may be cited. These devices have been heretofore used for disintegration of a gel-like polymer having a solid content in the range of 30-50 wt. %. For the purpose of preventing the disintegrating operation from entailing a kneading motion and inducing mutual adhesion of the product of disintegration, these devices have required addition of such an anti-adhesion agent as silicone oil and such a detackifier as a surfactant to the hydrate gel-like polymer. The surfactant lowers the surface tension and consequently degrades the property of absorption and the silicone oil impairs the property of water absorption owing to its lipophilicity and consequently forms a cause for degrading the quality of the water-absorbent resin. By using the conventional simple device and water as an additive according to this invention, it is made possible to execute the disintegration so efficiently as to prevent the disintegrating operation from generating a kneading motion and the product of disintegration from yielding to mutual adhesion and as well produce a water-absorbent resin excelling in safety such that when the water-absorbent resin is used for disposable diapers and sanitary napkins, it does not bring about the bad effect of the additives. That is, this invention is characterized by executing the disintegration of a hydrate polymer with the screw extruder while adding water to the hydrate polymer during the course of the disintegration. Incidentally, the term "water" as used in the present specification embraces all the forms of water, namely solid, liquid, and gas.

The supply of water does not need to be particularly discriminated on account of the method of supply and the timing of supply, for example. The water is only required to be supplied into the device between the time the hydrate polymer is threw to the screw extruder and time it passes through the perforated plate. The hydrate polymer added water in advance can be threw the screw extruder and disintegrated therein as a preferable example of "disintegrated while supplying water." One example of the preferred mode of embodying this invention will be described below with reference to FIG. 1.

Figure 1:
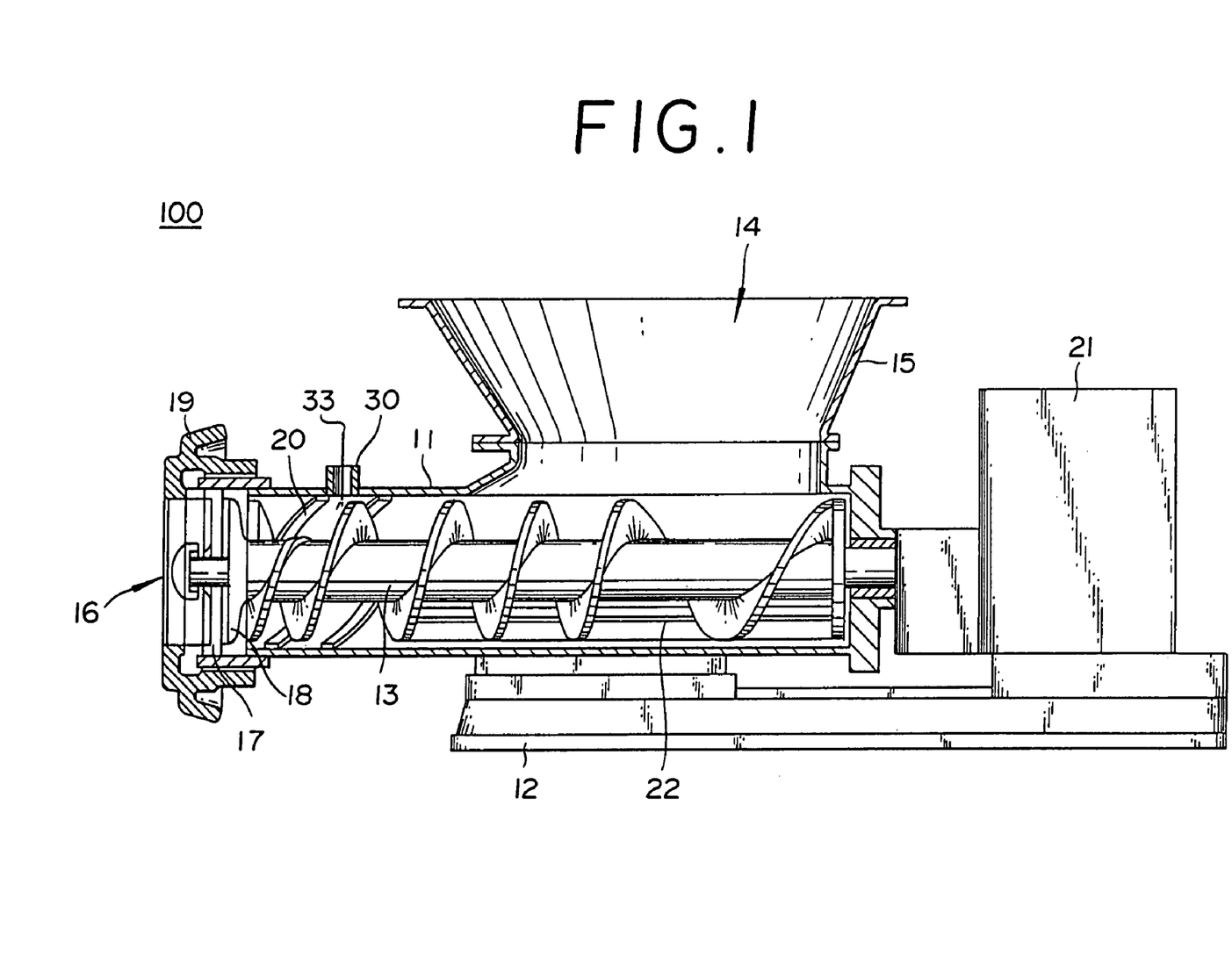
FIG. 1 is a diagram illustrating in cross section one example of the screw extruder which can be preferably used in the method for the disintegration contemplated by this invention.

A screw extruder 100 illustrated in FIG. 1 has a screw 13 of a single axis built inside a cylindrical casing 11 as laid along the longitudinal direction of the casing 11. This screw is rotated by the driving of a motor 21. The hydrate polymer introduced through a supply port 14 is passed through a hopper 15, brought in the casing 11, and moved toward an extrusion port 16 by the rotation of the screw 13. A perforated plate 17 is disposed in the terminal part of the screw 13. The hydrate polymer is disintegrated by being pushed out by a rotary blade 18 and passed through the perforated plate 17. The disintegrated hydrated polymer is passed through the extrusion port 16 and pushed out to the exterior of the disintegrating device. The perforated plate 17 is detachably fixed with a ring 19.

The water may be introduced together with the hydrate polymer through the supply port 14. It may be otherwise introduced through a supply port which is disposed separately of the supply port 14 used for the hydrate polymer. When the hydrate polymer is in the shape of a belt or a sheet having a broad width and a continuous length, the water is preferred to be supplied through a water supply nozzle 30 disposed at a portion separated from the hopper 15, for example, in the space between the supply port 14 and the perforated plate 17. When the hydrate polymer with such a broad width and a continuous length and water are supplied through the hopper 15, the water will not be added uniformly to the polymer and the uniform mixture of the hydrate polymer with water will be difficult. When the water supply nozzle 30 is disposed between the supply port 14 and the perforated plate 17, the hydrate polymer and water can be mixed uniformly because water is supplied to the hydrate polymer which has been disintegrated to a certain extent by the rotary vanes of the screw 13. The kneading motion of the hydrate polymer and the mutual adhesion of the product of disintegration are liable to occur particularly when the hydrate polymer is passing through the perforated plate 17 or it is being cut by the rotary blade 18. By supplying water prior to these treatments, such problems as the generation of a kneading motion and the mutual adhesion of the product of disintegration can be solved. The mechanism which is responsible for the derivation of this effect from the addition of water remains yet to be elucidated fully. This effect, however, may be logically explained by a postulate that the added water is allowed to remain on the surface of the hydrate polymer, caused by the agitation of the screw to spread throughout the entire surface of the hydrate polymer, allowed after the disintegration to adhere to the cut surfaces and consequently contribute to preventing the product of disintegration from mutual adhesion. The addition of water, therefore, is preferred to resort to a method which comprises introducing water into the disintegrating device prior to the introduction of the hydrate polymer, a method which comprises introducing the hydrate polymer and the water through one and the same portion such as, for example, through the supply port for the hydrate polymer simultaneously with the introduction of the hydrate polymer into the disintegrating device, and a method which comprises introducing the water through a supply port separated from that for the hydrate polymer simultaneously with the introduction of the hydrate polymer to the disintegrating device.

This invention allows the water to be used in any of the three forms, namely solid, liquid, and gas. From the standpoint of the ease of handling, the water is preferred to be in the form of liquid and/or gas. When the water is in the form of liquid, though the temperature of the water at the time of its supply does not need to be particularly discriminated, it is properly in the range of 10-220° C., preferably in the range of 40-120° C., more preferably in the range of 70-110° C., and most preferably in the range of 80-100° C.

When the water is in the form of liquid, the amount of this water to be supplied is properly in the range of 0.1-30 parts by weight, more preferably in the range of 0.5-20 parts by weight, and particularly preferably in the range of 1-10 parts by weight per 100 parts by weight of the hydrate polymer. If the amount falls short of 0.1 part by weight, the shortage will possibly prevent the effect of the addition from being manifested fully satisfactorily and suffer the disintegrating operation to generate a kneading motion. Conversely, if the amount exceeds 30 parts by weight, the excess will result in necessitating thermal energy for drying the water in the product of disintegration and time for the drying in unduly large amounts and consequently compelling a sacrifice of economy. The water, no matter whether it may be in the form of gas or liquid, is allowed to incorporate therein such additives as a polymerization initiator, a pharmaceutical preparation capable of reacting with the residual monomer, an alkali, or an acid on the condition that the addition will not impair the property of the water-absorbent resin.

When the water is supplied in the form of gas, the temperature of the water at the time of supply preferably falls in the range of 100-220° C., more preferably in the range of 100-160° C., and particularly preferably in the range of 100-130° C. The method for preparing the water in the form of gas does not need to be restricted. For example, a method which comprises generating steam by heating a boiler and utilizing this steam and a method which comprises vibrating water with a supersonic wave thereby inducing generation of water in the form of gas from the water surface and utilizing this gaseous water are available. When the water is supplied in the form of gas, this invention prefers the steam to have an increased pressure instead of an atmospheric pressure. From this point of view, it is preferable to use the steam generated by the boiler.

The pressure used for the supply of the steam preferably falls in the range of 5-600 kPa and more preferably in the range of 10-300 kPa. The reason for this range is that a lower pressure than 5 kPa possibly prevents the steam from being distributed throughout the entire interior of the screw extruder and a higher pressure than 600 kPa possibly forces the steam to leak through the supply port and the extrusion port of the screw extruder and results in loss of steam. For the sake of supplying the steam of such high pressure, it suffices to connect the pipe for the supply of steam directly to the water supply nozzle of the screw extruder. Preferably, this water supply nozzle is disposed at a position not too close to the extrusion port for the hydrate polymer or not too close to the supply port for the hydrate polymer, namely in the central part of the barrel. It is permissible to provide a plurality of water supply nozzles.

When the water is supplied in the form of gas, the amount of the water to be supplied properly falls in the range of 0.1-20 parts by weight, preferably in the range of 0.2-10 parts by weight, and more preferably in the range of 0.5-5 parts by weight per 100 parts by weight of the hydrate polymer. If this amount falls short of 0.1 part by weight, the shortage will possibly prevent the effect of addition from being manifested fully satisfactorily and compelling the disintegrating operation to generate a kneading motion. Conversely, if the amount exceeds 20 parts by weight, the excess will result in necessitating thermal energy for drying the water in the product of disintegration and time for the drying in unduly large amounts and consequently compelling a sacrifice of economy. When the water is supplied not in the form of liquid but in the form of gas, since the amount of addition as reduced to weight is smaller in the form of gas, this supply is at an advantage in decreasing the load of drying at the subsequent step. Though the reason for this advantage remains yet to be elucidated, the advantage may be logically explained by a postulate that the surface of the hydrate polymer is uniformly coated with the steam and the condensed heat by the steam heightens the temperature of the material.

This invention, as a means to supply water, prefers the steam to be supplied under an increased pressure and not under the atmospheric pressure. The supply of the steam under an increased pressure is favorable because the ratio of decrease of the amount of the residual monomer is large as described in the working example to be cited herein below in addition to preventing the kneading motion and the mutual adhesion and decreasing the amount of a water-soluble component. Though the reason for this advantage remains yet to be elucidated, the advantage may be logically explained by a postulate that the temperature of the material is elevated and this elevation of temperature results in facilitating the advance of the polymerization of the residual monomer in the hydrate polymer.

The temperature of the hydrate polymer to be introduced into the screw extruder falls preferably in the range of 40-120° C., more preferably in the range of 50-100° C., and particularly preferably in the range of 60-90° C. If this temperature falls short of 40° C., the shortage will result in necessitating an addition to the amount of the water to be supplied. Conversely, if this temperature exceeds 120° C., the excess will be at a disadvantage in rendering the handling of the hydrate polymer difficult under normal pressure. When the temperature of the hydrate polymer is higher than the upper limit of the range mentioned above, the disintegrating operation is preferred to be started after the hydrate polymer has radiated excess heat. Conversely, when the temperature of the hydrate polymer prior to the introduction into the disintegrating device is lower than 40° C. or has fallen below 40° C., the disintegrating operation is preferred to be started after the temperature of the hydrate polymer has been elevated. The method for elevating the temperature of the hydrate polymer mentioned above does not need to be particularly restricted. For example, the hydrate polymer may be heated to an elevated temperature by the use of a proper heating device.

The thickness of the perforated plate 17, the diameter and numerical aperture of the perforated plate, the amount of the hydrate polymer to be treated by the disintegrating device per unit time, and the properties of the hydrate polymer may be properly selected.

The screw extruder to be used for this invention may be provided near the extrusion port 16 with such a back-flow preventing member 20 as is disclosed in JP-A-2000-63527 or on the screw 13 with serrated projections 22. The materials and sizes of these components and members, the materials of the back-flow preventing member 20 and the various rotary blades belonging to the screw mentioned above, and all the structures relating to the screw extruder may be selected by following the procedure disclosed in JP-A-2000-63527 mentioned above with necessary modifications. The back-flow preventing member 20, for example, does not need to be particularly restricted but is only required to be so constructed as to control the back-flow of the hydrated polymer at least near the extrusion port 16. It may be formed of spiral or concentric banded projections disposed on the inner wall of the casing 11 or serrated projections or granular, spherical, or angular projections disposed parallelly to the direction of advance of the screw 13, for example. The hydrate polymer tends to flow back in the direction of the supply port 14 as the pressure near the extrusion port 16 is heightened in consequence of the advance of the disintegration. When the projections of a varying shape mentioned above are installed to serve as the back-flow preventing member 20, they are capable of finely dividing the hydrate polymer preventing the hydrate polymer from flowing back.

The particle diameter after the disintegration of the hydrate polymer, namely the product of disintegration is only required to be such that the product will be thoroughly dried to the core in the subsequent drying step. It falls properly in the range of 0.1-20 mm, preferably in the range of 0.5-10 mm, and particularly preferably in the range of 1-5 mm. If the particle diameter of the product of disintegration falls short of 0.1 mm, the shortage will be at a disadvantage in inducing the phenomenon of clogging during the course of drying, lowering the efficiency of drying, and crushing the air bubbles in the polymer. Conversely, if the particle diameter of the hydrate polymer after the disintegration exceeds 20 mm, the excess will render difficult thorough drying of the product of disintegration to the core.

The second aspect of this invention is directed toward providing a method for the disintegration of a hydrate polymer with a screw extruder, in which the polymer is disintegrated while supplying 0.1-20 parts by weight of steam per 100 parts by weight of the polymer under an increased pressure rather than the atmospheric pressure to the extruder.

It has been known to disintegrate a hydrate polymer with a screw extruder. This disintegration has required addition of a varying anti-adhesion agent or detackifier for the purpose of precluding such adverse phenomena as the generation of a kneading motion the induction of mutual adhesion. As already pointed out with respect to the first aspect of this invention, the kneading motion and the mutual adhesion can be prevented by supplying water to the screw extruder being operated to disintegrate the hydrate polymer having a solid content in the range of 50-70 wt. %. This fact suggests that when the hydrate polymer having a conventional solid content is similarly disintegrated, the kneading motion and the mutual adhesion can be prevented by supplying the steam under a higher pressure than the atmospheric pressure instead of adding an anti-adhesion agent or a detackifier. Of course, it is permissible to use the water in the form of liquid or a hot water in conjunction with the steam of a higher pressure than the atmospheric pressure. The amount of solid content of the hydrate polymer which is contemplated by this invention may apply to any hydrate polymer which has been disintegrated heretofore with the screw extruder. The solid content falls preferably in the range of 30-70 wt. % and more preferably in the range of 40-60 wt. %. Even when the solid content is so low as to fall preferably in the range of 30-50 wt. % and more preferably in the range of 40-50 wt. %, the second aspect of this invention can be advantageously applied where the temperature of the hydrate polymer is so low as to fall below 50° C. or the diameter of the nozzle of the perforated plate is decreased so as to disintegrate the hydrate polymer more finely.

When the hydrate polymer is disintegrated by the method described above and the drying step and the pulverizing and classifying step are subsequently carried out, the water-absorbent resin consequently produced excels in the absorption capacity under no load, the content of a soluble component, and the content of the residual monomer. Thus, the third aspect of this invention is directed toward a method for the production of a water-absorbent resin by a procedure including the disintegrating step mentioned above.

Now, the method for disintegrating and the method for the production of a water-absorbent resin according to this invention will be described in detail below.

The method of this invention for the production of a water-absorbent resin by a procedure including the step of disintegrating a hydrate polymer is preferred to be carried out through the following steps.

(1) Preparation of Monomer Solution

The hydrate polymer as the target for the disintegration contemplated by this invention is a hydrate polymer having a carboxyl group, which is obtained, for example, by polymerizing a hydrophilic unsaturated monomer having acrylic acid and/or a salt thereof as a main component. As concrete examples of the hydrate polymer answering this description, the heretofore well-known polymers which form hydrophilic cross-linked polymers capable of swelling with water and incapable of dissolving in water may be cited.

The hydrophilic cross-linked polymer is preferred to have 30 mol % -100 mol %, properly 50 mol % -90 mol %, and particularly 60 mol % -80 mol % of the acid group thereof neutralized as with an alkali metal salt, an ammonium salt, or an amine salt. The expression "hydrate polymer having a carboxyl group," therefore, ought to be construed as embracing "a hydrate polymer having a carboxyl group and/or a salt thereof." The neutralization of the acid group may be accomplished by neutralizing a hydrophilic unsaturated monomer during the preparation thereof prior to the formation of a hydrate polymer and subsequently starting a reaction of polymerization on the neutralized monomer or by neutralizing the acid group of the cross-linked polymer during the course of polymerization or after completion of the reaction of polymerization. Optionally, these two procedures may be used in combination. The hydrophilic unsaturated monomer mentioned above, when necessary, may contain an unsaturated monomer other than the acrylic acid or a salt thereof. As hydrophilic unsaturated monomers and other monomers mentioned above, those which are enumerated in the paragraph [0040] of JP-A-2002-212204 may be used. When such other monomer is additionally used, the amount of this monomer preferably falls below 30 mol % and more preferably below 10 mol % based on the total amount of the hydrophilic unsaturated monomer.

The hydrate polymer is preferred to have a cross-linked structure introduced therein by the use of an inner cross-linking agent. The inner cross-linking agent mentioned above does not need to be particularly restricted but is only required to a compound possessing in each of the molecules thereof a plurality of polymerizing unsaturated groups and/or reactive groups capable of reacting with a carboxyl group. The inner cross-linking agent has to be a compound which possesses in each of the molecules thereof a plurality of substituent groups capable of copolymerizing with a hydrophilic unsaturated monomer and/or reacting with a carboxyl group. Incidentally, the hydrophilic unsaturated monomer may be formed of a self-crosslinking type compound which is capable of forming a cross-linked structure without requiring use of an inner cross-linking agent.

As concrete examples of the inner cross-linking agent, the inner cross-linking agents which are enumerated in page 4of JP-A-1998-182750 may be cited. These inner cross-linking agents may be used either singly or in the form of a mixture of two or more members. By using, in all the inner cross-linking agents cited above, the inner cross-linking agent which possesses in each of the molecules thereof a plurality of polymerizing unsaturated groups, it is made possible to enhance further the absorption properties of the produced water-absorbent resin. The amount of the inner cross-linking agent to be used may be properly selected so as to suit the solid state properties of the water-absorbent resin to be aimed at. When the hydrophilic unsaturated monomer is polymerized to produce the hydrate polymer, the reaction system for the polymerization allows addition thereto a hydrophilic high polymer such as starch, starch derivative, cellulose, cellulose derivative, polyvinyl alcohol, polyacrylic acid (salt), or a cross-linked polyacrylic acid (salt); a chain transfer agent such as hypophosphorous acid; and a water-soluble or water-dispersible surfactant.

(2) Polymerization

The method for polymerizing a monomer solution containing a hydrophilic unsaturated monomer does not need to be particularly restricted. Any of the well-known methods such as, for example, aqueous solution polymerization, reversedphase suspension polymerization, bulk polymerization, and precipitation polymerization may be adopted. The reaction conditions such as the reaction temperature and the reaction time may be properly selected to suit the composition of the monomer components to be used. In the polymerization of the hydrophilic unsaturated monomer, therefore, any of the polymerization initiators heretofore well known to the art may be adopted. For example, the polymerization initiators enumerated in the paragraph [0054] of JP-A-2002-212204 may be used either singly or in the form of a mixture of two or more members. The amount of the polymerization initiator to be used may be properly selected to suit the polymerization temperature, for example.

The form of the hydrated polymer obtained by the polymerization varies with the method of polymerization. The hydrated polymer may assume any of various forms such granules, a belt, a plate, and clay. In this invention, the hydrate polymer can be disintegrated irrespectively of the form which is assumed by the polymer. Preferably, it assumes the form of a belt. This is because the belt, when supplied to the screw extruder, is tangled around the rotary vanes and subjected efficiently to the disintegrating motion. The hydrate polymer of the form of a belt is preferred to have a thickness falling preferably in the range of 1-30 mm and more preferably in the range of 3-20 mm. If this thickness falls short of 1 mm, the shortage will result in degrading the productivity. Conversely, if the thickness exceeds 30 mm, the excess will possibly result in preventing the polymer from easily entering the screw extruder. Even when the hydrate polymer fails to satisfy the requirement of having a solid content in the range of 50-70 wt. % owing to a fluctuation of the water content thereof, the method for disintegrating contemplated by this invention can effectively disintegrate this polymer where the hydrate polymer is enabled by addition of water or by drying to acquire a solid content in the range mentioned above.

The hydrate polymer having a solid content in the range of 50-70 wt. % and used as the target for the disintegration by the method of this invention may be obtained by a method which, as disclosed in JP-A-1992-175319 (Sanyo Kasei K.K.) or in JP-A-1999-181005 (Nippon Shokubai Co., Ltd.), comprises starting polymerization at a low temperature, causing the polymerization to proceed gently while removing heat, and repressing the peak temperature below about 90° C. thereby forming a water-absorbent resin of high quality. The preparation of this hydrate polymer may otherwise be obtained by a method which, as disclosed in JP-A-1997-67404 (BASF) and U.S. Pat. No. 6,187,828 (BASF), comprises starting polymerization at a low temperature in a cylindrical polymerization vessel and effecting the polymerization diabatically or a method which, as disclosed in JP-A-2002-212204, comprises effecting stationary polymerization with evaporation of water in such a manner that the concentration of the monomer component in the aqueous solution is not less than 45 wt. % and the ratio of the solid concentration of the hydrate polymer formed by the polymerization and the solid concentration in the aqueous monomer solution, that is, concentration ratio is not less than 1.10 thereby producing a water-absorbent resin having a solid concentration of not more than 80 weight % in the hydrate polymer.

Incidentally, a hydrate polymer having a solid content of less than 50 wt. % can be prepared by any of the methods disclosed in the documents of JP-B-1991-73576, JP-A-1998-87842, JP-A-1999-35691, JP-A-1994-41319, JP Patent No. 3145461, JP-A-1999-188727 and JP-A-2000-63527 mentioned above.

This invention preferably adopts a method for continuously obtaining a hydrate polymer of the form of a belt by continuously mixing and stirring a hydrophilic unsaturated monomer such as acrylic acid, a polymerization initiator, and an aqueous alkali solution for use in the neutralization of a hydrophilic unsaturated monomer thereby preparing a monomer solution, continuously supplying the monomer solution onto a belt, and quickly polymerizing the monomer solution by utilizing the heat of neutralization and polymerization.

(3) Disintegrating Hydrate Polymer

The disintegrating device to be used in this invention is a screw extruder which is procurable at a low cost, compact in build, and easy and convenient to operate.

When the hydrate polymer in the form of a belt is supplied to the screw extruder, the belt is continuously tangled around the rotary vanes, disintegrated, and conveyed toward the perforated plate. When water or steam is injected through a nozzle used for the supply of water at this point, the water is spread on the surface of the product of disintegration to prevent the hydrate polymer from adhering to the screw. The water is also dispersed on the disintegrated surface in consequence of the rotation of the screw and prevent the product of disintegration from mutual adhesion.

By the method for the disintegration contemplated by this invention, the product of disintegration is dispersed without inducing mutual adhesion and is extruded in the form of finely divided fluid gels. When a traverse feeder connected to the dryer is disposed below the extrusion port, therefore, the product of disintegration can be dropped in a uniform thickness on the belt used for drying through the medium of this feeder.

(4) Drying

The hydrate polymer which is obtained in a particulate form in consequence of the disintegration may be dried. For this drying, an ordinary dryer or heating furnace maybe used. For example, ventilation band drier, stirring drier, rotary drier, disc drier, fluidized-bed drier, air current drier, infrared drier, microwave drier, hot air drier, drum drier, and agitation drier are available for the purpose of the drying. This invention, for the purpose of preventing the dried hydrate polymer from sustaining a physical injury or inducing generation of a fine powder due to friction, prefers a method which dries a given article with hot air without moving the article as observed in a ventilation band drier.

Figure 2:
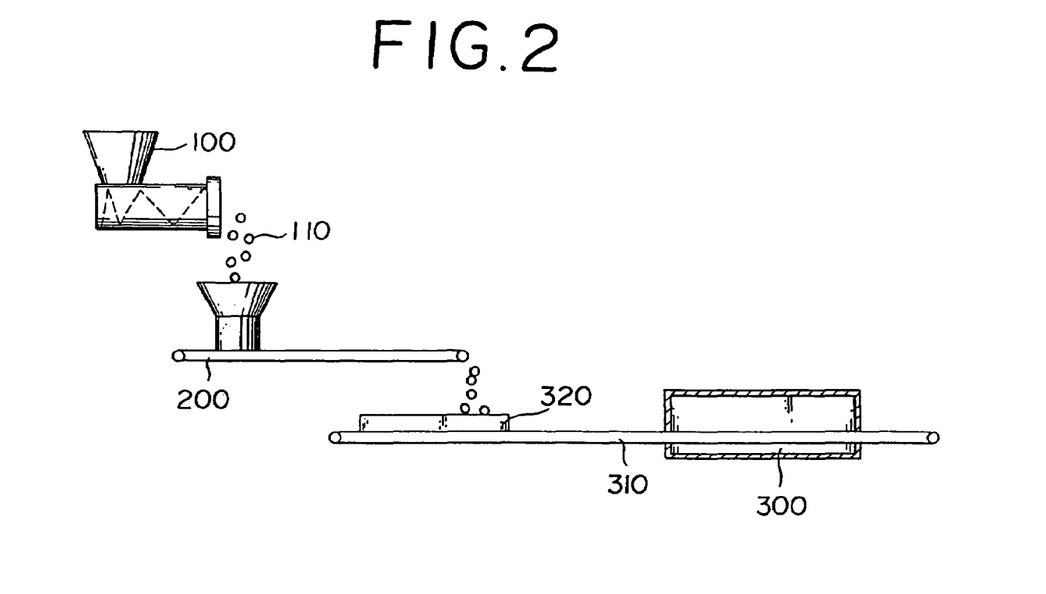
FIG. 2 is a diagram illustrating in cross section one example of the mode of uniformly dispersing the product of disintegration with a traverse feeder into a tray on a conveyor.
Figure 3:
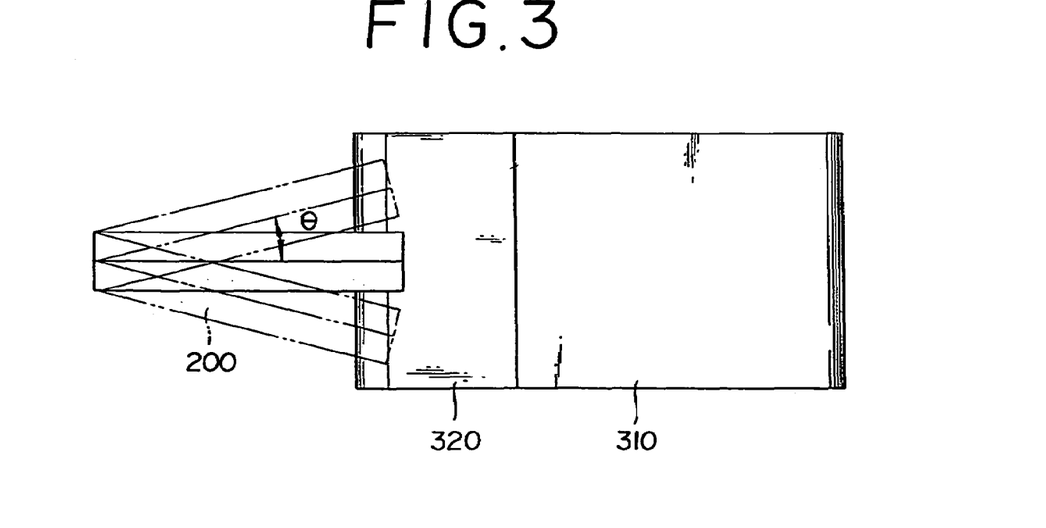
FIG. 3 is a diagram illustrating in cross section the relation between the traverse feeder and the tray on the drying belt conveyor which goes through a dryer.

When the drying resorts to stationary drying which is obtained by the use of a ventilation band drier, for example, the product of disintegration is preferred to be uniformly dispersed within the drier. The method for disintegrating contemplated by this invention excels in the ability to disperse the product of disintegration uniformly because it prevents the product of disintegration from generating a kneading motion and inducing mutual adhesion. The uniform dispersion is easily attained by causing a product of disintegration 110 emanating from the disintegrating device 100 to be dispersed through the medium of an traverse feeder 200 on a belt conveyor 310 annexed to a ventilation drier 300 by using a drying vat 320 as illustrated in FIG. 2. The angle of oscillation, θ, of the traverse feeder 200 shown in FIG. 3 and the speed of the belt maybe arbitrarily selected to suit the average particle of the product of disintegration and the amount of the hydrate polymer to be shred per unit time, for example.

Though the drying temperature varies with the method of drying, the drying performed at a temperature in the range of 100-250° C. for a period in the range of 3-120 minutes proves sufficient in the case of the ventilation band drier, for example.

The product of this drying has a solid content which falls generally in the range of 85-99 wt. % and preferably in the range of 90-98 wt. %. The solid content is computed on the loss in weight on drying at 180° C. for three hours.

(5) Pulverization

The pulverization of the dried product can be carried out by a shaking mill, a roll granulater (paragraph [0174] of JP-A-1997-235378), a knuckle type pulverizer, a roll mill (paragraph [0069] of JP-A-2002-527547), a high-speed rotary pulverizer (pin mill, hammer mill, screw mill, and roll mill) (paragraph [0036] of JP-A-1994-41319), or a cylindrical mixer (paragraph [0008] of JP-A-1993-202199), for example.

(6) Classification

Though the dried product obtained as described above may be used in its unmodified form as a water-absorbent resin, it may be classified to obtain a particulate water-absorbent resin of a prescribed size. In this case, the particle size falls below 2 mm and preferably in the range of 10 μm -1 mm. While the average particle diameter varies with the kind of use, it falls generally in the range of 100-100 μm, preferably in the range of 150-800 μm, and more preferably in the range of 300-600 μm. The proportion of particles which pass a sieve having an aperture of 150 μm falls preferably below 15 wt. %, more preferably below 10 wt. %, and more preferably below 5 wt. %. This classification can be carried out by using a shaking sift or an air current classifier, for example.

The water-absorbent resin which is obtained as described above may be in any of various forms such as spheres, scales, amorphous shred pieces, fibers, granules, rods, balls, and flat pieces.

(7) Surface Cross-linking Treatment

The water-absorbent resin obtained as described above may be optionally subjected to a surface cross-linking treatment so as to yield a water-absorbent resin endowed with a cross-linked surface. By this treatment for cross-linking the surface, the water-absorbent resin enjoys improvement in the ratio of absorption capacity under high pressure, the ability to pass liquid, and the speed of absorption. For this treatment for cross-linking the surface, any of the well-known surface cross-linking agent for use in the surface cross-linking treatment of a water-absorbent resin and any of the well-known methods for surface cross-linking treatment may be adopted.

EXAMPLES

Now, this invention will be described more specifically below with reference to working examples and a comparative example. This invention is not to be limited to these examples. In the examples, the term "parts" refers to "parts by weight" unless otherwise specified and the temperature of measurement is in the approximate range of 23±2° C.

(Methods of Determination)

The absorbing property of a water-absorbent resin was determined by the following computation.

(1) Determination of Absorption Capacity Under No Load (GV)

About 0.2 g of a given water-absorbent resin was weighed out, placed in a pouch of non-woven fabric (60 mm×60 mm), and immersed in an aqueous 0.9 wt. % sodium chloride solution (physiological saline solution). The pouch was pulled out of the bath after 30 minutes' standing therein, drained for three minutes by the use of a centrifugal separator at 250× 9.81 m/s² (250 G), and the weight of the pouch, $W_1$ (g) was measured. The procedure was repeated without using the water-absorbent resin and the weight of the pouch, $W_0$ (g), was measured. The GV (absorption capacity under no load) was computed in accordance with the following formula.

GV(g/g)=[($W_1$/$W_0$)/weight of water-absorbent resin]−1

(2) Determination of Content of Soluble Component

In a plastic container having an inner volume of 250 ml and fitted with a stopper, 184.3 g of an aqueous 0.9 wt. % NaCl solution (physiological saline solution) was placed and this aqueous solution and 1.00 g of a given water-absorbent resin were added together and stirred for 16 hours to extract the soluble component from the resin. The extracted solution was filtered and 50.0 g of the filtrate consequently obtained was used as the solution for determination. Preparatorily, the physiological saline solution alone was titrated to pH 10 with an aqueous 0.1N NaOH solution and subsequently, it was titrated to pH 2.7 with an aqueous 0.1N HCl solution to obtain blank titers ([bNaOH] ml, [bHCl] ml). By performing this procedure of titration on the solution for determination, the titera aimed at ([NaOH] ml, [HCl] ml) were obtained. In the case of a water-absorbent resin formed of acrylic acid and a sodium salt thereof, for example, the content of the soluble component in the water-absorbent resin (wt. %) was computed in accordance with the following formula, using the weight average molecular weight Mw as the monomer and the titers obtained by the preceding procedure. The unit of the neutralization ratio was mol %.

Soluble Component=0.1×Mw×184.3×100×{[HCl]−[bHCl]}/1000/1.0/50.0;

it is provided that Mw =72.06×{1−neutralization ratio/100}+94.04×neutralization ratio/100 and;

neutralization ratio={1−({NaOH}−{bNaOH})/({HCl}−{bHCl})×100

(3) Determination of Residual Monomer

One thousand (1000) g of deionized water and 0.5 g of a given water-absorbent resin were added together, stirred to effect extraction for two hours. The stirred mixture was filtered with a filter paper to separate a swelled and gelled water-absorbent resin. The filtrate consequently obtained was analyzed with liquid chromatography to determine the content of the residual monomer. The content of the residual monomer in the water-absorbent resin was determined by using as the external standard the calibration curve obtained by analyzing the standard monomer solution of a known concentration in the same manner as above and taking into account the ratio of dilution of the filtrate.

EXAMPLE 1

Figure 4:
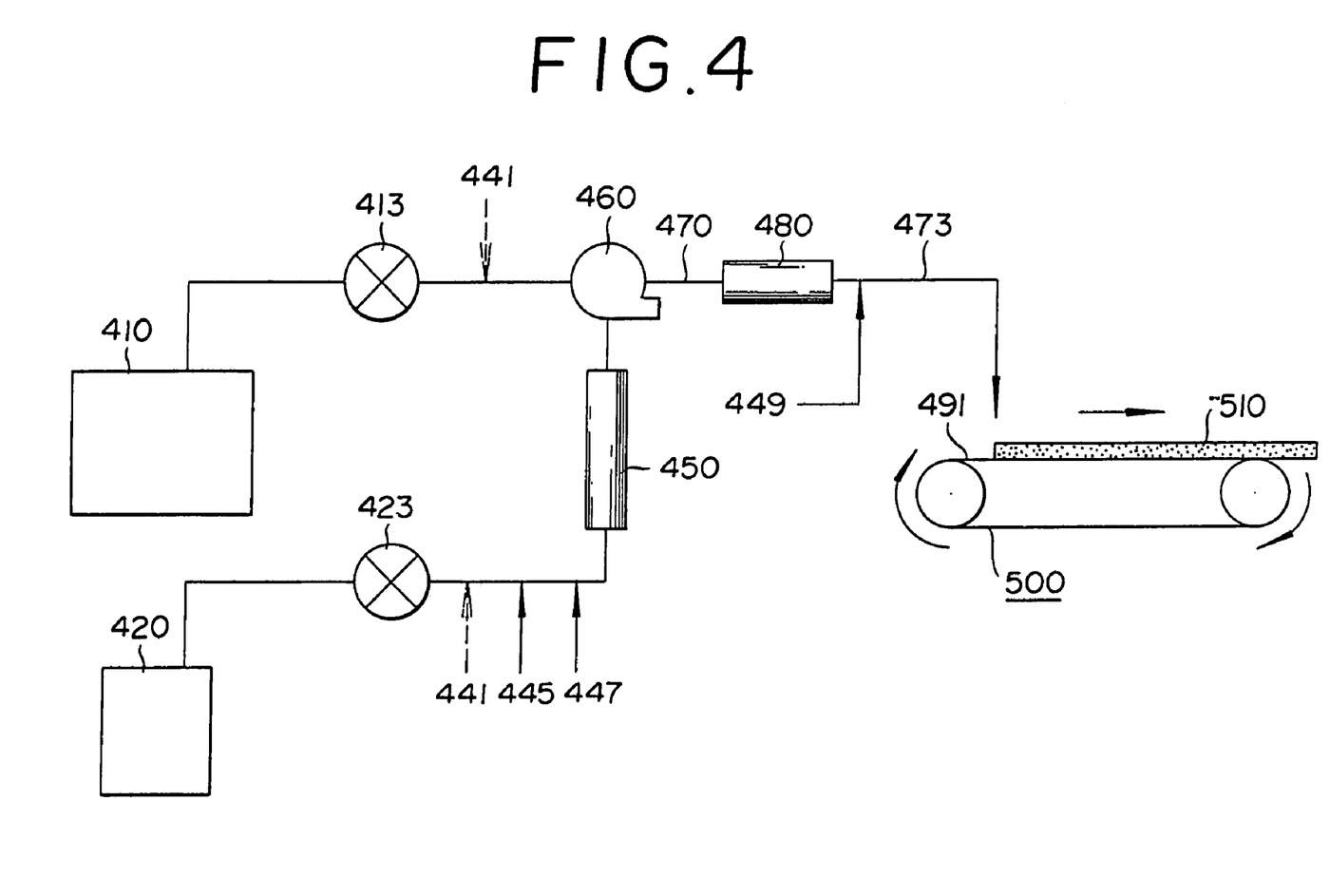
FIG. 4 is a flow diagram illustrating one example of the method for producing a hydrate polymer.

A water-absorbent resin was produced by using an apparatus illustrated in FIG. 4. A monomer solution 470 was prepared by supplying an aqueous 48.5 wt. % sodium hydroxide solution as an aqueous alkali solution for neutralization 410 at a flow rate of 5.83 g/s adjusted with a pump 413, acrylic acid as a hydrophilic monomer 420 at a flow rate of 7.24 g/s adjusted with a pump 423, an aqueous 30 wt. % polyethylene glycol diacrylate (average molecular weight 487) solution as a first inner cross-linking agent 445 at a flow rate of 0.0287 g/s, water 441 as a concentration adjusting water 441 at a total flow rate of 3.32 g/s, and a solution having 0.989 part by weight of 1-hydroxy-cyclohexyl-phenyl ketone and 1.08 parts by weight of an aqueous 45 wt. % pentasodium diethylene triamine pentaacetate solution dissolved in 97.4 parts by weight of an aqueous 20 wt. % acrylic acid solution as a second inner cross-linking agent 447 at a flow rate of 0.0893 g/s to a dispersing device 460. In this case, acrylic acid, water, and first and second inner cross-linking agents were uniformly stirred individually with a stirrer 450 prior to supply to the dispersing device 460. The temperature of the monomer solution 470 consequently obtained was stabilized at about 95° C. This monomer solution 470 was stirred with a stirrer 480 obtained as a static mixer by inserting an element measuring 18.6 mm in length and 6 mm in diameter and twisted with 1.5 rotations into a pipe 6 mm in diameter. At a position parted by about 3 cm from the rearmost part of the element toward the downstream side, the stirred monomer solution and an aqueous 2 wt. % sodium persulfate solution supplied as a polymerization initiator 449 at a flow rate of 0.151 g/s were joined to form a mixed solution 473. This mixed solution was supplied to a belt polymerizing device 500 furnished with an endless belt 491 measuring 3.8 m in length and 60 cm in width and having the surface thereof coated with a fluororesin, provided above the belt with a UV lamp (not shown), having the bottom surface and the periphery thereof kept heated at about 100° C., and provided in the central part thereof with a suction pipe (not shown) and continuously polymerized thereon to obtain a hydrate polymer 510 of the form of a belt. The length of the pipe from the point of confluence of the polymerization agent to the exhaust port directed at the polymerizing device was about 30 cm. The hydrate polymer 510 was in the form of a belt 3-7 mm in thickness and had a solid content of 58 wt. %.

The hydrate polymer having the surface temperature of about 50° C. was led continuously to a screw extruder shown in FIG. 1 and shred therein, with steam continuously injected therein through a water supply nozzle. The pressure of the steam was 50-70 kPa and the pore diameter of the perforated plate was 13 mm. The product of disintegration emanating from the extruder was a free-flowing gel particles emitting vapor and had a solid content of 56.5 wt. %. The screw extruder mentioned above resulted from providing a device illustrated in FIG. 1 of JP-A-2000-63527 with a water supply nozzle.

As illustrated in FIG. 2, an feeder 200 was disposed under the extruder as a disintegrating device 100 and a drying vat 320 was disposed on a belt conveyor 310 under the feeder 200. Consequently, the product of disintegration emanating from the extruder 100 could be easily arranged in a uniform thickness on the drying vat 320. The angle of oscillation (indicated by θ in FIG. 3) of the traverse feeder was set at 25° C.

By inserting the drying vat 320 having the product of disintegration spread thereon into a hot air drier kept at 180° C., the product of disintegration was dried. The dried product was ground with a roll mill to obtain a water-absorbent resin (1) in a granular form. The particle shaving diameters in the range of 300 μm to 600 μm were separated from the granular water-absorbent resin (1) by using a sift. The separated particles were tested for the absorption capacity under no load, the content of the soluble component, and the content of the residual monomer. The results are shown in Table 1.

EXAMPLE 2

A water-absorbent resin (2) was obtained by following the procedure of Example 1 while injecting hot water at 80° C. in the place of steam into the disintegrating device. The product of disintegration emanating from the extruder possessed fluidity and had a solid content of 55 wt. %. It was tested for the absorption capacity under no load, the content of soluble component, and the content of the residual monomer in the same manner as in Example 1.

COMPARATIVE EXAMPLE 1

The procedure of Example 1 was repeated with the exception of introducing nothing through the water supply nozzle. The product of disintegration emanating from the screw extruder was a nearly continuous length. The solid content of this product of disintegration was 58 wt. %.

When this product was arranged on the drying vat 320 in the same manner as in Example 1, it assumed a jogging state.

Then a particulate water-absorbent resin for comparison (Comparison 1) was obtained in the same manner as in Example 1 and was tested for the absorption capacity under no load, the content of soluble component, and the content of the residual monomer.

TABLE 1

|  | GV (g/g) | Soluble component (wt. %) | Residual monomer (ppm) |
| --- | --- | --- | --- |
| Hydrophilic resin (1) | 37 | 12 | 200 |
| Hydrophilic resin (2) | 37 | 13 | 270 |
| Hydrophilic resin (Comparison 1) | 36 | 21 | 400 |

The invention claimed is:

1. A method for disintegrating a hydrate polymer, the method comprising:
   placing a hydrate polymer having a solid content in the range of 50-70 wt. % in a screw extruder, the hydrate polymer being formed of a hydrophilic unsaturated monomer having acrylic acid or a salt thereof, and
   disintegrating said hydrate polymer in the screw extruder, in which said hydrate polymer is disintegrated while supplying 0.1-30 parts by weight of freely-flowing water at a temperature in the range of 70-110° C., water steam at a temperature in the range of 100-220° C., or a mixture thereof, per 100 parts by weight of said hydrate polymer.

2. A method according to claim 1, wherein the water is supplied in the state of steam of a higher pressure than the atmospheric pressure.

3. A method according to claim 1, wherein said hydrate polymer is a hydrate polymer of water-absorbent resin.

4. The method of claim 1, wherein said screw extruder include a screw, a rotary blade, and a perforated plate, wherein the perforated plate is disposed at one end of the screw and the rotary blade is disposed adjacent to the perforated plate, the perforated plate and the rotary blade both being perpendicular to the axis of the screw; and the screw, the rotary blade and the perforated plate are so arranged that, when the screw is rotating, the polymer is first conveyed by the screw toward and crushed by the rotary blade and then pressed through the perforated plate.

5. The method of claim 1, wherein the hydrate polymer is disintegrated before being dried.

6. The method of claim 3, wherein the hydrate polymer is disintegrated before being dried.

* * * * *